(No Model.)
O. D. WARFIELD.
CALIPERS.
No. 288,961. Patented Nov. 20, 1883.
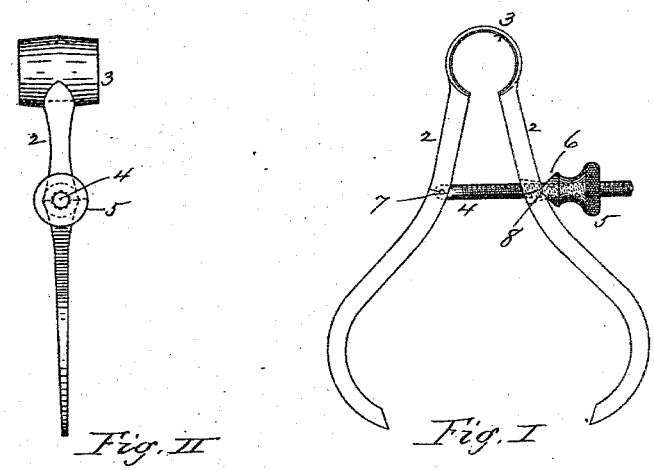
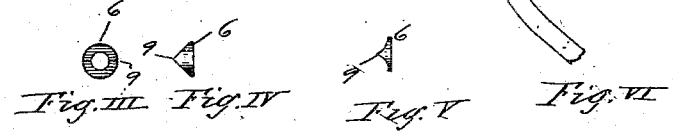
Witnesses.
C. S. Hurlbut
E. E. Curtis
Inventor.
Oliver D. Warfield
By T. A. Curtis.
his Atty.

UNITED STATES PATENT OFFICE.

OLIVER D. WARFIELD, OF CHICOPEE FALLS, MASSACHUSETTS.

CALIPERS.

SPECIFICATION forming part of Letters Patent No. 288,961, dated November 20, 1883.

Application filed October 10, 1883. (No model.)

*To all whom it may concern:*

Be it known that I, OLIVER D. WARFIELD, of Chicopee Falls, in the county of Hampden and State of Massachusetts, have invented a new and useful Improvement in Calipers, of which the following is a specification and description.

The object of my invention is to provide the adjusting-screw of calipers with a self-adjusting washer, and with a cylindrical thumb-nut, whereby the bearing and the action of the latter in moving the legs of the calipers may be uniform, and the movement of the adjusting-nut may be easily made by the thumb and fingers of one hand of the operator when desired; and I accomplish this by the mechanism substantially as hereinafter described, and illustrated in the accompanying drawings, in which—

Figure I is a side view of calipers having my invention applied. Fig. II is an edge view of the same. Fig. III is a front view of the bearing-edge on one side of the washer. Fig. IV is an edge view of the washer. Fig. V is an edge view of a modification of the washer; and Fig. VI is a side view of a portion of one leg of the calipers, showing the cavity in which the bearing-edge of the washer has its bearing.

In the drawings, 2 represents the legs of the calipers, which are united by the spring 3 at the head, and in one of these legs is pivoted at 7 the adjusting-screw 4, which extends through a hole in the other leg, which hole I make somewhat elongated in the direction of the length of the leg, so that the screw may not bind therein as the legs approach their extreme limits of movement, either inward or outward. In the outer edge of the leg through which the hole is made and through which the adjusting-screw 4 extends I make a cavity, 8, extending transversely across the leg, and preferably of an approximately triangular form in its cross-section, and upon the adjusting-screw 4, outside the leg, I place a washer, 6, one side of which I make flat, and with two inclined or approximately inclined faces on the opposite side, which faces unite at the apex 9, this apex forming a knife-edge, which may be more or less sharp or angular, as desired, and which extends across one side of the washer, as shown in Fig. III. Instead of these inclined sides being flat, I may make them more or less concave, as shown in Fig. V, which will of course make the apex or edge 9 more sharp and pointed in its cross-section. I then turn a thumb-nut, 5, onto the screw 4, outside of the washer 6 and against the latter, with the edge 9 of the washer placed in the transverse cavity 8 in the leg of the calipers, and the spring 3 operates to keep the leg always against the washer and the edge 9 in its place in said cavity, whether the nut be turned toward or from the leg of the calipers, in which case the washer will tilt either in one direction or the other in the cavity, and the nut 5 will always have the whole face of its inner end bearing against the outer face of the washer, if both are properly made, and this bearing will be uniform, whether the legs of the calipers be extended or drawn near together.

In the ordinary calipers it will be seen that the legs, as they are opened or closed, form an angle with each other, which is more or less obtuse, and on this account the inner face of the adjusting-nut 5 is constantly changing in its bearing-contact with the leg or with an ordinary washer, a large portion of its face bearing against the calipers when the legs are closed, and but a small portion of its face having a bearing when the legs are extended, and this unequal bearing causes a corresponding uneven wear of the inner end of the nut, and of that portion of the leg of the calipers against which it bears, and the adjusting-nut, as a consequence, turns harder with the legs in certain positions than in others. My invention entirely obviates this trouble, and enables the operator to easily adjust the legs of the calipers to any object, in taking its measurement, with the thumb and fingers of one hand, while the other hand may be occupied, which is often desirable to do.

Having thus described my invention, what I claim as new is—

1. In combination with the legs of a calipers, one of which is provided with a transverse cavity, 8, an adjusting-screw pivoted in the other leg and extending through the leg containing said transverse cavity, an adjusting-nut adapted to be turned on said screw, and a washer, 6, having a bearing-edge, 9, placed on said screw between said nut and the leg containing said cavity, substantially as described.

2. The combination of the adjusting-screw pivoted in one leg of the calipers and extending through the other leg, containing a transverse cavity across its outer face, a cylindrical adjusting-nut adapted to be turned on said screw, and a washer, 6, placed on said screw, and having a projecting edge on one side bearing in said cavity, and adapted to bear against said nut on the other side, substantially as described.

OLIVER D. WARFIELD.

Witnesses:
I. H. PAGE,
F. J. WARNER.